Jan. 14, 1969

JAMES E. WEBB
ADMINISTRATOR OF THE NATIONAL AERONAUTICS
AND SPACE ADMINISTRATION
PRESSURE VARIABLE CAPACITOR 3,422,324

Filed May 17, 1967

INVENTOR:
Royal G. Harrison, Jr.

ATTORNEYS

Jan. 14, 1969  JAMES E. WEBB  3,422,324
ADMINISTRATOR OF THE NATIONAL AERONAUTICS
AND SPACE ADMINISTRATION
PRESSURE VARIABLE CAPACITOR

Filed May 17, 1967  Sheet 2 of 3

INVENTOR:
Royal G. Harrison, Jr.

ATTORNEYS

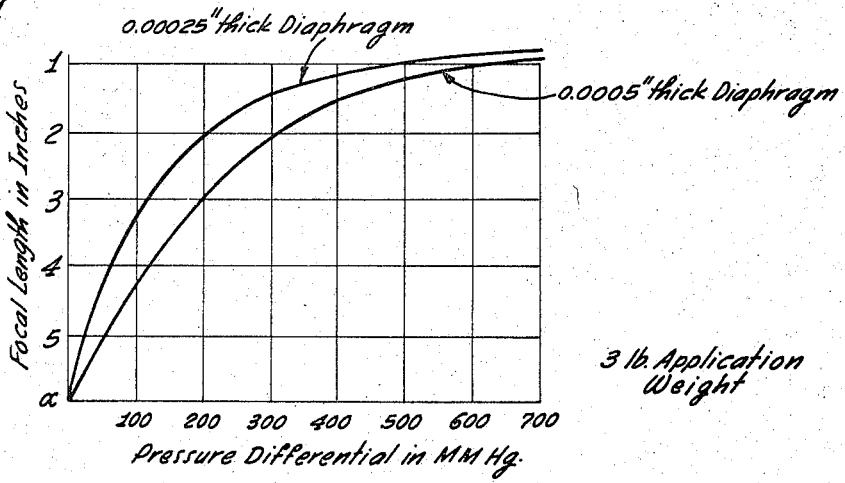
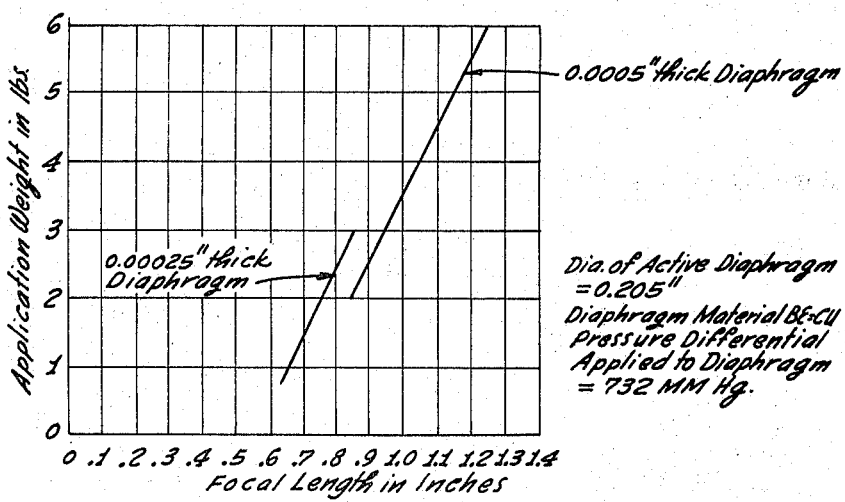
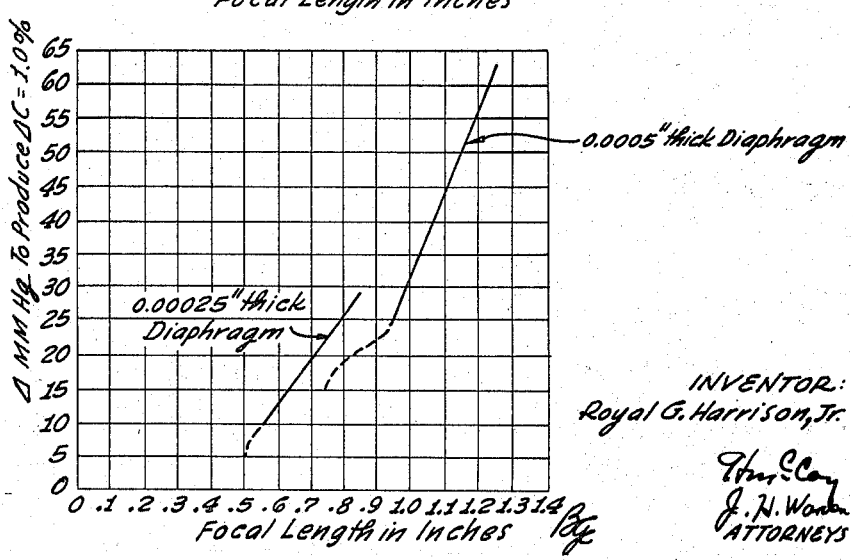

3,422,324
PRESSURE VARIABLE CAPACITOR
James E. Webb, Administrator of the National Aeronautics and Space Administration with respect to an invention of Royal G. Harrison, Jr., La Canada, Calif.
Filed May 17, 1967, Ser. No. 640,460
U.S. Cl. 317—246                    7 Claims
Int. Cl. H03g 7/00

ABSTRACT OF THE DISCLOSURE

A pressure sensing apparatus providing a unique electrical capacitor assembly which may be incorporated into a tank circuit of a telemetry oscillator for providing a wireless remote pressure sensing device, and the unique fabrication process therefor. The capacitor assembly includes two body members, one of which constitute a capacitive plate, of the capacitor. A beryllium copper diaphragm, which is the other capacitive plate, is securely attached between the two body members and the body members are firmly sealed to each other by means of an epoxy potting material.

Origin of the invention

The invention described herein was made in the performance of work under a NASA contract and is subject to the provisions of Section 305 of the National Aeronautics and Space Act of 1958, Public Law 85-568 (72 Stat. 435; 42 USC 4257).

Background of the invention

The pressure sensing apparatus of the present invention relates to the field of art of pressure transducers and to force measuring and sensing devices. The pressure sensing apparatus of the instant invention is particularly useful for pressure telemetering in the study of interference free pressure data on models projected into free flight within a hypersonic continuous flow wind tunnel, for example.

Pressure sensitive transducers of the capacitance type previously have been recognized as effective means for measuring pressure differentials. Some of the transducers previously known within the state of the art have utilized diaphragms mounted between the electrical electrodes which form the electrical capacitor of the transducer. Most known capacitance type pressure sensitive transducers however have required complex and intricate mounting and retaining structure for the diaphragm and for the electrical electrodes with which the diaphragm structure is functionally related. Since the pressure sensing apparatus of this invention has been created for use on models which are projected into free flight within a hypersonic continuous flow wind tunnel the capacitor assembly and its related structure must be sensitive and accurate as well as rugged and durable, attributes not found to be characteristic of generally known capacitance type transducers.

It is known to those familiar with the state of the art that a movable electrode may be used in conjunction with a fixed electrode for producing a capacitance type transducer. The patent to G. W. Coon, 3,027,769, discloses such a transducer. The Coon patent states that the pressure transducer disclosed therein is suitable for use as a survey probe in the dynamic testing of aircraft and missile components. However, the Coon capacitance transducer does not provide the simplicity of structural members, their organization or their functional cooperative relationship as is characteristic of the construction of the transducer of the instant invention.

The transducer of the instant invention is required to have high sensitivity to small incremental changes of pressure differential and continuous linear performance over a relatively broad range of pressure differentials to be measured. These required attributes are not found to be characteristic of generally known capacitance type transducers.

The construction and assembly techniques and processes used for producing prior art capacitance type pressure sensitive transducers involve numerous structural members and tedious steps in the organization, assembly and final construction of the structural members into a pressure sensitive transducer. These prior known practices have been studiously simplified by the fabrication process used for producing the transducer of the instant invention.

Summary

The capacitance transducer of the present invention is quickly and easily constructed by means of a simplified expedient fabrication process which produces a highly sensitive, accurate pressure sensitive transducer sufficiently rugged and durable so that the transducer may be utilized for pressure telemetering on models projected into free flight within a hypersonic continuous flow wind tunnel. A very thin film beryllium copper material has been utilized for the movable diaphragm member mounted between the two electrodes of the capacitance transducer. The thin film beryllium copper material has been utilized so as to eliminate the effect of magnetic fields on the transducer and so as to provide for a quick acting, sensitive response within the transducer. As is well known, a fundamental principle of capacitors is that capacitance varies inversely with distance between electrode members. Therefore, the construction of the transducer of the present invention provides for maximum capacitance, and sensitivity, by means of considerably simplified structural members. Similarly, it is a well known fundamental principle that capacitance varies directly with the active area of the electrode members. The capacitance transducer of the present invention is constructed so as to provide maximum active electrode surface area, thus increasing sensitivity and performance characteristics for optimizing the desired results obtained by this capacitance transducer.

Accordingly, an object of the invention is to provide a capacitance transducer wherein a thin diaphragm is attached to a first body member for forming a movable electrode and a second body member is firmly attached to the diaphragm and first body member so as to provide a rugged and durable capacitance transducer having extremely good sensitivity to pressure differential and good continuous linear performance over relatively broad ranges of pressure differential values.

Another object of the invention is to provide a capacitance transducer which is insensitive to magnetic fields and which includes a movable electrode having small displacement from a fixed electrode and which has a relatively large active area in relation to the fixed electrode so as to provide for optimum performance output from the transducer.

Another object of the invention is to provide a capacitance transducer which is quickly, easily, simply and economically constructed thereby providing a rugged and durable capacitance transducer composed of few structural members.

Another object of the invention is to provide a simple fabrication process including only a few fabricating steps which may be simply and easily performed for producing an efficient and effective capacitance transducer.

The novel features considered characteristic of this invention are set forth with particularity in the appended claims. The invention itself as to its organization, method of operation and fabrication process, as well as additional objects and advantages thereof, will best be understood

Description of the drawings

FIGURE 7 is a graphical plot of pressure differential applied to the transducer versus diaphragm focal length for varying pressure differentials;

FIGURE 8 is a graphical plot of diaphragm focal length versus weight applied to the diaphragm for producing tension therein prior to attachment to the reference body member of the transducer;

FIGURE 9 is a graphical plot of diaphragm focal length versus pressure differential applied to the transducer diaphragm wherein the particular pressure differential values produced a one percent change of capacitance for the capacitance transducer.

Description of the preferred embodiment

Figure 1:
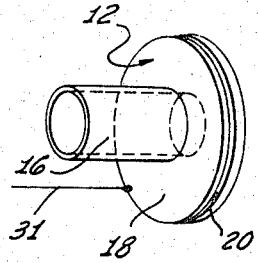
FIGURE 1 is a perspective view of the stator, or first body member of the capacitance transducer.

Referring to FIGURES 1, 2, 3 and 4 of the drawing, it is seen that the capacitance transducer 10 of the instant invention includes a stator 12 and a reference body member 14. The stator 12 is provided with a tubular extension 16 which projects from the outer surface of the stator. The tubular extension 16 in the constructed embodiment of the invention is provided with an outside diameter of 0.095 inch and an inside diameter of 0.078 inch. The extension 16 provides a passageway for fluid pressure to enter the capacitance transducer 10 for purposes more fully explained herein below.

The enlarged portion 18 of the stator 12 is provided with an outside diameter of 0.275 inch. The length of the enlarged portion is 0.063 inch. A groove 20 has been provided on the exterior surface of portion 18 of stator 12. In the constructed embodiment of the invention the groove 20 is provided with dimensions of 0.015 inch by 0.015 inch. The groove 20 provides retaining structure for epoxy potting material 22 used for bonding the stator 12 to the reference body member 14.

Figure 2:
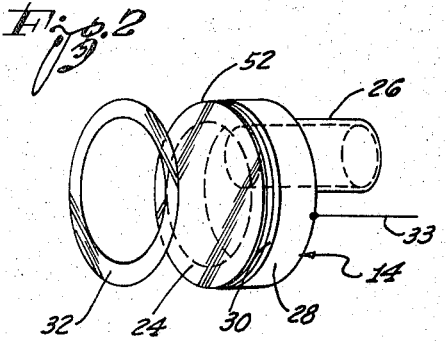
FIGURE 2 is a perspective view of the reference body, or second body member of the capacitance transducer showing the spacer between the two body members and the diaphragm attached to the reference body member.
Figure 3:
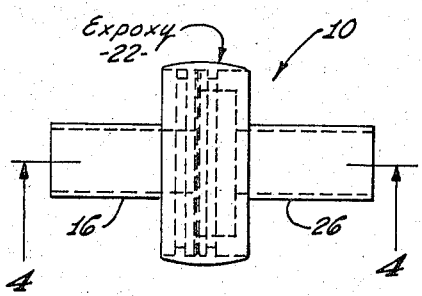
FIGURE 3 is a top view of the capacitance transducer.
Figure 4:
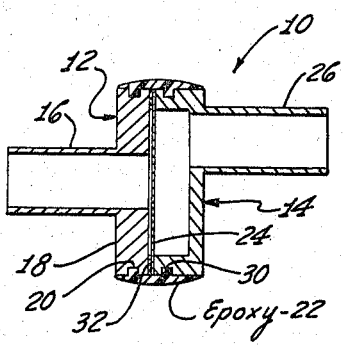
FIGURE 4 is a sectional view of the capacitance transducer taken on line 4—4 of FIGURE 3.

A thin film beryllium copper diaphragm 24 is firmly attached to the outer portion of the reference body member 14 as shown in FIGURES 2, 3 and 4. A soft, low melting point solder is used for attaching the diaphragm 24 to the reference body member.

The reference body member 14 of the capacitance transducer 10 as shown in FIGURES 2, 3 and 4 is provided with a tubular extension 26. In the constructed embodiment of the invention, the tubular extension 26 is provided with an outside diameter of 0.095 inch and an inside diameter of 0.078 inch. The total length of the reference body member in the constructed embodiment of the invention is 0.325 inch. The enlarged portion 28 of the reference body member is provided with an outside diameter of 0.275 inch and an inside diameter of 0.210 inch. The length of the enlarged portion 28 is 0.125 inch and the length of the internal cavity within portion 28 is 0.100 inch within the constructed embodiment of the invention.

A groove 30 is provided in the outer peripheral portion of the reference body member. The groove 30, similar to the groove 20 in the stator 12, is provided with the dimensions of 0.015 inch by 0.015 inch. The groove 30, as groove 20 in stator 12, is for receiving and retaining epoxy potting material for firmly bonding the stator and the reference body member together in order to construct the capacitance transducer of this invention.

A "Mylar" spacer 32, which is effectively a spacer made of a polyester film, is inserted between the stator 12 and the reference body member 14 of the transducer 10. The spacer 32 covers a portion of the diaphragm 24 when the transducer 10 is constructed in its final form, as shown in FIGURES 3 and 4. Electrical leads 31 and 33 are attached to the stator and reference body respectively by any of several well known attaching means.

Figure 5:
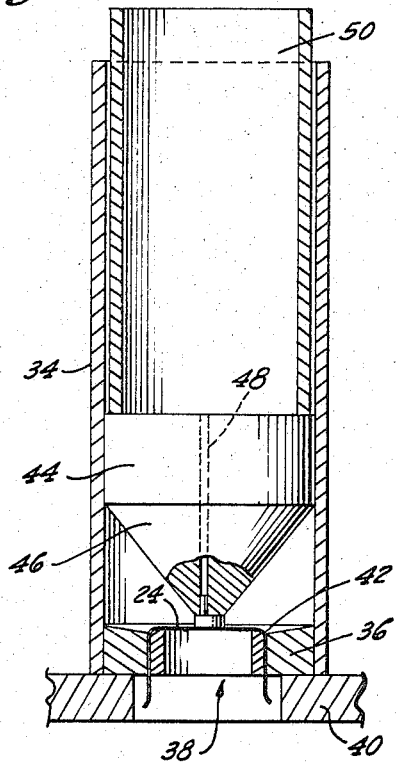
FIGURE 5 is a sectional view of the apparatus utilized for the fabrication of the capacitance transducer.

The capacitance transducer of the instant invention is produced by an exceptionally simple and easily understood process and by utilizing inexpensive and easily obtainable fabricating apparatus in a manner which includes easy to follow techniques. Referring to FIGURE 5, it can be seen that the apparatus used for fabricating the transducer 10 includes a cylindrical member 34 having a lower cylindrically shaped bottom portion 36. An opening 38 is provided in this bottom portion 36 and in the mounting platform 40 upon which the cylindrical member 34 is mounted. A ring member 42 having an outside diameter substantially equal to the inside diameter of bottom portion 36 is utilized in a manner to be described infra for preparing the thin film beryllium copper diaphragm material for application upon and adherence to the reference body member 14 of the capacitance transducer 10. A weight supporting platform 44 which has a conically shaped lower portion 46 adapted for firmly fitting upon the outer peripheral upper surface of the reference body member 14 is utilized for applying weight to the reference body member, and through the reference body member to the diaphragm material, in order to effect a desired tension of the diaphragm material prior to its application to the outer peripheral surface of the reference body member in a manner described infra.

In constructing the capacitance transducer 10 of this invention a thin film diaphragm material, preferably beryllium copper, is used. The diaphragm material is placed over the ring member 42, and thereafter the ring member is inserted into the bottom portion 36 of the cylindrical member 34. The dimensional tolerances existing between the outer diameter of the ring 42 and the portion 36 are sufficiently close so that the diaphragm material 24, which previously has been stretched across the top of the ring 42, is firmly held between the members 36 and 42.

The reference body 14 of the transducer 10 is placed on top the thin film beryllium copper diaphragm material 24 after the diaphragm material has been stretched over the ring 42 and firmly held between the members 36 and 42. The weight supporting platform 44, which is provided with a tubular opening 38 for accommodating the tubular extension 26 of the reference body 14 is placed upon the reference body so that extension 26 is retained within opening 38. A predetermined weight 50 is then placed on the weight supporting platform 44 for producing a desired amount of tautness in the thin film diaphragm material. The application of various predetermined weights upon the platform 44 will produce varying degrees of tautness in the diaphragm material, producing results within the capacitance transducer as shown in FIGURES 7, 8 and 9. When the reference body, supporting platform and predetermined weight applied thereto are supported by the diaphragm material, apparatus required for the construction of the transducer is thereby assembled and the diaphragm material is ready for attachment to the outer peripheral edge of the reference body.

Prior to placing the reference body on the diaphragm material a soft low melting point solder is applied to the outer peripheral edge 52 of the reference body to which the diaphragm material is to be attached. The solder is allowed to cool prior to the application of the reference body to the diaphragm material. After the reference body is placed upon the diaphragm material, and the proper degree of tautness for the diaphragm material has been obtained, as indicated supra, heat is applied to the underside of the diaphragm material, as shown in FIGURE 5, and the solder thereby melted. When the solder is permitted to cool, the diaphragm material thereby becomes firmly attached to the body member.

When the solder has cooled and the diaphragm material thereby firmly attached to the reference body the excess diaphragm material is then cut away from the reference body member. A "Mylar" spacer 32, as shown in FIGURE 2, is then placed over a portion of the diaphragm material. The stator 12 is then placed upon the "Mylar" spacer and an epoxy potting material is applied to the outer peripheral surfaces of the stator 12 and the reference body 14. The epoxy material flows into the grooves 20 and 30 provided in the stator and reference body, respectively. When the epoxy potting material hardens, the stator, "Mylar" spacer and reference body, with the thin film diaphragm material firmly attached thereto, are securely bound together so as to produce the rugged and significantly effective capacitance transducer of the invention.

Figure 6:
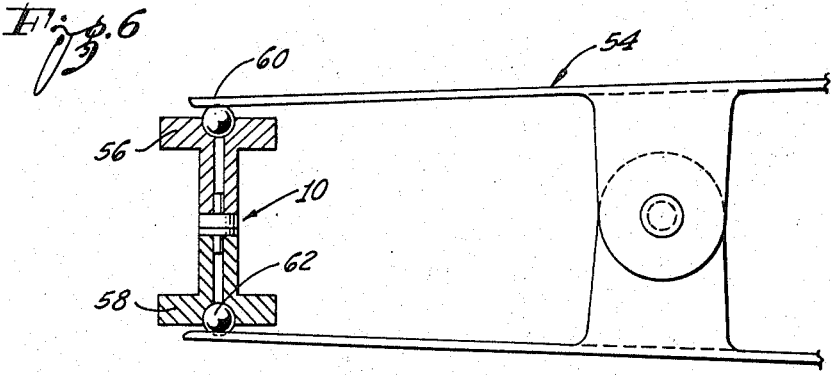
FIGURE 6 is a side view, partially in cross section, of the clamping apparatus utilized for retaining the body members for the bonding process in the fabrication of the capacitance transducer.

A clamping device 54, as shown in FIGURE 6, may be utilized for retaining the transducer structural members in an optimum position for permitting the epoxy potting material to harden and thereby firmly bond all of the structural members of the transducer into an effective, rugged and durable capacitance transducer.

Upper and lower holders 56 and 58, shown in FIGURE 6, are provided with tubular openings therein for receiving the tubular extensions 16 and 26 of the stator and reference body, respectively. The clamping device 54 is preferably provided with spherical tips 60 and 62 for fitting snugly within recessed portions provided within the retaining members 56 and 58 respectively, as shown in FIGURE 6. It has been found that a clamping pressure substantially in the range of 30 p.s.i. is adequate for producing the degree of clamping force required for firmly holding the structural members of the transducer in close association while the epoxy potting material is permitted to harden.

Referring to FIGURES 7, 8 and 9 it is seen that various test and operating data have been obtained for beryllium copper diaphragms having a thickness of 0.0025 inch and 0.005 inch. FIGURE 7 shows a graphical plot for a pair of curves showing the relationship of pressure differential, measured in millimeters of mercury, applied to the diaphragm of the transducer versus diaphragm focal lengths measured in inches for varying values of pressure differential applied to the diaphragm of the transducer. The measurement of focal length is a convenient means for determining curvature produced in the diaphragm material when the diaphragm is subjected to varying particular values of pressure differential. Diphragm focal length may be determined in a well known and conventional manner by means of reflected light rays which are reflected from the surface of the diaphragm material and which come to a focus at measurable, ascertainable distance from the diaphragm. The measured focal length, of course, will depend upon the degree of curvature produced upon the diaphragm material by the pressure differential applied to the diaphragm. For example, referring to FIGURE 7, it is seen that as the value of pressure differential applied to the diaphragm increases from 0–700 millimeters mercury the focal length, for both the 0.00025 inch and the 0.0005 inch diaphragms, decreases. As pressure differential increases greater than 500 millimeters mercury, the focal length of the 0.00025 inch thick diaphragm decreases to less than one inch. Similarly, as the pressure differential to which the diaphragm is exposed increases greater than 650 millimeters mercury, the focal length for the 0.0005 inch thick diaphragm decreases to less than one inch. Thus, the plotted curves shown in FIGURE 7 indicate the effect of pressure differential on diaphragm movement when fluid pressure is applied to the diaphragm through the tubular extensions 16 and 26 of the stator and reference body respectively. All data shown in FIGURE 7 were obtained from the movement of beryllium copper diaphragm materials applied to the reference body member, as indicated supra, with a three pound application weight.

The graphical plot shown in FIGURE 8 shows the relationship of application weight, in pounds, applied to produce a tautness in the diaphragm material versus the focal length produced in the 0.00025" and the 0.0005" thick beryllium copper diaphragms when subjected to a pressure differential of 732 millimeters mercury. In obtaining the results shown in FIGURE 8 a diaphragm having a diameter of 0.205 inch was used. FIGURE 8 shows that a linear relationship exists for both the 0.00025 inch thick and the 0.0005 inch thick diaphragms relative to application weight versus focal length produced when the diaphragm of the transducer is subjected to a pressure differential of 732 millimeters mercury. Thus, FIGURE 8 shows that accurate predictions can be made for the transducer diaphragm sensitivity. For example, if a focal length of 0.85 inch were required for a 0.00025 inch thick diaphragm when subjected to a pressure differential of 732 millimeters mercury a weight of three pounds would be applied to the diaphragm material prior to its being attached to the reference body of the transducer in a manner as indicated supra. Likewise, if a focal length of 1.05 inches were required for a 0.0005 inch thick diaphragm when subjected to a pressure differential of 732 millimeters mercury a weight of four pounds would be applied to the diaphragm material prior to its being attached to the reference body.

The graphical plot shown in FIGURE 9 shows the amount of pressure differential change which when applied to the transducer diaphragm will affect a one percent change in capacitance for the capacitance transducer when the transducer diaphragm has previously been subjected to a 732 millimeter mercury pressure differential. In obtaining the data shown in FIGURE 9 diaphragms of both 0.00025 inch thickness and 0.0005 inch thickness were fabricated by the process described supra so as to have focal lengths of varying values as plotted along the horizontal axis as shown in FIGURE 9. Thus, it can be seen, for example, by reference to FIGURE 9 that a transducer with a 0.00025 inch thick diaphragm having a focal length of 0.8 inch when subjected to a pressure differential of 732 millimeters mercury will require a change of 25 millimeters mercury pressure differential in order to produce a one percent change in capacitance of the capacitance transducer. Likewise, a transducer with a 0.0005 inch thick diaphragm having a focal length of 1.15 inches when subjected to a pressure differential of 732 millimeters mercury will require a change of 50 millimeters mercury pressure differential in order to produce a one percent change in capacitance of the capacitance transducer.

The lower dotted line portion of the curves shown in FIGURE 9 indicate a non-linear relationship for the 0.00025 inch thick diaphragm and the 0.0005 inch thick diaphragm which occurred at particular focal lengths as shown in FIGURE 9. It was found that the application of an insufficient weight for producing a required minimum tautness of the diaphragm material resulted in the non-linearity as indicated by the dotted line portion of the curves for the particular diaphragm focal lengths as shown in FIGURE 9.

It was found that an increase in diameter of 0.100 inch from the 0.205 inch diameter diaphragm produced an increased sensitivity by approximately a factor of four when same amounts of weight were applied in preparing the diaphragm material for attachment to the reference body. Minimum weights used for attaching the diaphragm material to the reference body were one pound weights for the 0.00025 inch thick diaphragm and four pound weights for the 0.0005 inch thick diaphragm.

It was found that good linear performance through a five percent change in capacitance is provided by the capacitance transducer of this invention. The constructed embodiment of the invention, shown in FIGURES 1–4 and described supra, produces a capacitance of seventeen picofarads when a zero pressure differential exists within the transducer.

As indicated hereinbefore the capacitance transducer of the invention may be incorporated into conventional and well known telemetry oscillator circuits. A colpitts oscillator has been indicated as preferable for use in the telemetry oscillator circuit because of its insensitivity to variations of circuit components other than the tank circuit.

The pressure telemeters including the capacitance type transducer of the instant invention have proved to be insensitive to accelerations encountered during wind tunnel operations, for example. At 100 g. there proved to be no measurable effects with the instrumentation used for data recording when pressure telemeters incorporating the capacitance transducer of the instant invention were utilized.

In tests run for the capacitance transducer of the instant invention, it was found that thermal stability has been exceptionally good for test times required of this transducer. The transducer of the invention has been found capable of withstanding over pressures of 100 p.s.i. The capacitance transducer is small in size and as indicated herein before its performance has been found to be linear. A response time of 75 microseconds has been obtained consistently with the transducer. The transducer dampens quickly because of the soft "Mylar" spacer which acts as a dampening ring on the diaphragm of the transducer.

It is appreciated, of course, that while a particular embodiment of the capacitance transducer of the invention and a process for the fabrication thereof have been shown and described herein, modifications may be made. It is intended that the following claims cover all such modifications as fall within the permissible range of equivalents in accordance with the scope and spirit of the invention.

What is claimed is:
1. A capacitance transducer comprising:
 a first body member, said first body member having an opening therein for the passage of fluid pressure therethrough, said first body member being made of an electrical conductive material and having an electrical lead attached thereto;
 a second body member;
 said second body member having an opening therein for the passage of fluid pressure therethrough, said second body member being made of an electrical conductive material and having an electrical lead attached thereto;
 a diaphragm, means for electrically and physically attaching said diaphragm to one of said body members; and
 means for bonding said first body member to said diaphragm;
 means for insulating said diaphragm from said second body member when said first and second body members are bonded together; and
 means for bonding said first body member to said second body member so that a fluid seal is established between said first and said second body members and the movement of said diaphragm responsive to the pressure differential existing between the fluid pressure within said first body member and the fluid pressure within said second body member produces a variance in the capacitance of said transducer thereby producing an electrical response proportional to the pressure differential existing between the fluid pressure within said first body member and the fluid pressure within said second body member.

2. A capacitance transducer in accordance with claim 1 wherein said diaphragm is made of a beryllium copper material.

3. A capacitance transducer in accordance with claim 1 wherein a spacer member covers a portion of said diaphragm and separates said diaphragm and said second body member from said first body member.

4. A capacitance transducer in accordance with claim 3 wherein said spacer member is made of a polyester film.

5. A capacitance transducer in accordance with claim 1 wherein said means for bonding said first body member to said second body member is an epoxy potting material.

6. A capacitance transducer in accordance with claim 5 wherein said first body member and said second body member are provided with indentations within the exterior surfaces of said body members so that epoxy material may be placed within the indentations and over a portion of the exterior surfaces of said body members for thereby bonding together said first body member and said second body member.

7. A capacitance transducer in accordance with claim 1 wherein means for electrically and physically attaching said diaphragm to said second body member by a soft, low melting point solder.

References Cited

UNITED STATES PATENTS

| 3,008,014 | 11/1961 | Williamson | 179—111 |
| 3,136,867 | 6/1964 | Brettell | 179—111 |

OTHER REFERENCES

Bulletin 6626, Rosemont Engineering Co., 1966, p. 3.
Condensed Chemical Dictionary, 6th ed., Reinhold, New York, 1962, p. 147.

LEWIS H. MEYERS, *Primary Examiner.*

E. GOLDBERG, *Assistant Examiner.*

U.S. Cl. X.R.

29—25.42; 73—398; 179—106